(12) United States Patent
Crump

(10) Patent No.: US 6,879,993 B1
(45) Date of Patent: Apr. 12, 2005

(54) APPARATUS AND METHOD FOR BINDING A CONNECTION-ORIENTED CLIENT TO A COMMUNICATION CHANNEL

(75) Inventor: Richard Crump, Boston, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/512,576

(22) Filed: Feb. 24, 2000

Related U.S. Application Data

(60) Provisional application No. 60/121,661, filed on Feb. 25, 1999.

(51) Int. Cl.[7] .............................................. G06F 15/16
(52) U.S. Cl. ...................... 709/203; 709/239; 709/238; 709/223; 370/229; 370/230; 370/474
(58) Field of Search ................................ 709/203, 238, 709/239, 223–228, 200, 250, 236; 345/700; 370/230, 474, 229, 397, 218; 717/1

(56) References Cited

U.S. PATENT DOCUMENTS

| | | | | | |
|---|---|---|---|---|---|
| 4,893,307 A | * | 1/1990 | McKay et al. | ............... | 370/389 |
| 4,951,278 A | * | 8/1990 | Biber et al. | ................... | 370/474 |
| 5,021,949 A | * | 6/1991 | Morten et al. | ............... | 709/231 |
| 5,428,607 A | * | 6/1995 | Hiller et al. | ................. | 370/352 |
| 5,450,411 A | * | 9/1995 | Heil | ............................ | 370/352 |
| 5,491,796 A | * | 2/1996 | Wanderer et al. | ........... | 709/224 |
| 5,630,061 A | * | 5/1997 | Richter et al. | .............. | 709/227 |
| 5,734,865 A | * | 3/1998 | Yu | .............................. | 709/250 |
| 5,805,804 A | * | 9/1998 | Laursen et al. | ............. | 709/223 |
| 5,835,724 A | * | 11/1998 | Smith | .......................... | 709/227 |
| 5,867,666 A | * | 2/1999 | Harvey | ........................ | 709/239 |
| 5,894,557 A | * | 4/1999 | Bade et al. | .................. | 709/228 |
| 5,917,823 A | * | 6/1999 | Benning et al. | ............. | 370/397 |
| 5,959,968 A | * | 9/1999 | Chin et al. | ................... | 370/216 |
| 5,970,048 A | * | 10/1999 | Pajuvirta et al. | ............ | 370/230 |
| 6,052,728 A | * | 4/2000 | Fujiyama et al. | ............ | 709/224 |
| 6,055,561 A | * | 4/2000 | Feldman et al. | ............. | 709/200 |
| 6,064,648 A | * | 5/2000 | Hellman et al. | ............. | 370/230 |
| 6,096,094 A | * | 8/2000 | Kay et al. | ....................... | 717/1 |
| 6,167,028 A | * | 12/2000 | Harris | .......................... | 370/230 |
| 6,185,288 B1 | * | 2/2001 | Wong | .......................... | 379/219 |
| 6,229,787 B1 | * | 5/2001 | Byrne | ......................... | 370/218 |

OTHER PUBLICATIONS

Transmission of IP Datagrams over Asynchronous Transfer Mode . . . —Cooper (1991); ftp.prz.tu–berlin.de/pub/net_doc/atm_dir/fore–draft.ps.Z.*
X.25 network tracing for Internet users—Dennis Jackson ; www.ja.net/CERT/JANET–CERT/../Jackson/X25_tracing.ps.*
X.25; Rhys Haden; www.rhyshaden.com/x25.htm.*

* cited by examiner

*Primary Examiner*—Thong Vu
(74) *Attorney, Agent, or Firm*—Steubing McGuinness & Manaras LLP

(57) ABSTRACT

Each connection-oriented client in a network device is bound to its own communication channel. The communication channel may be an X.25 logical channel having a single virtual circuit.

10 Claims, 5 Drawing Sheets

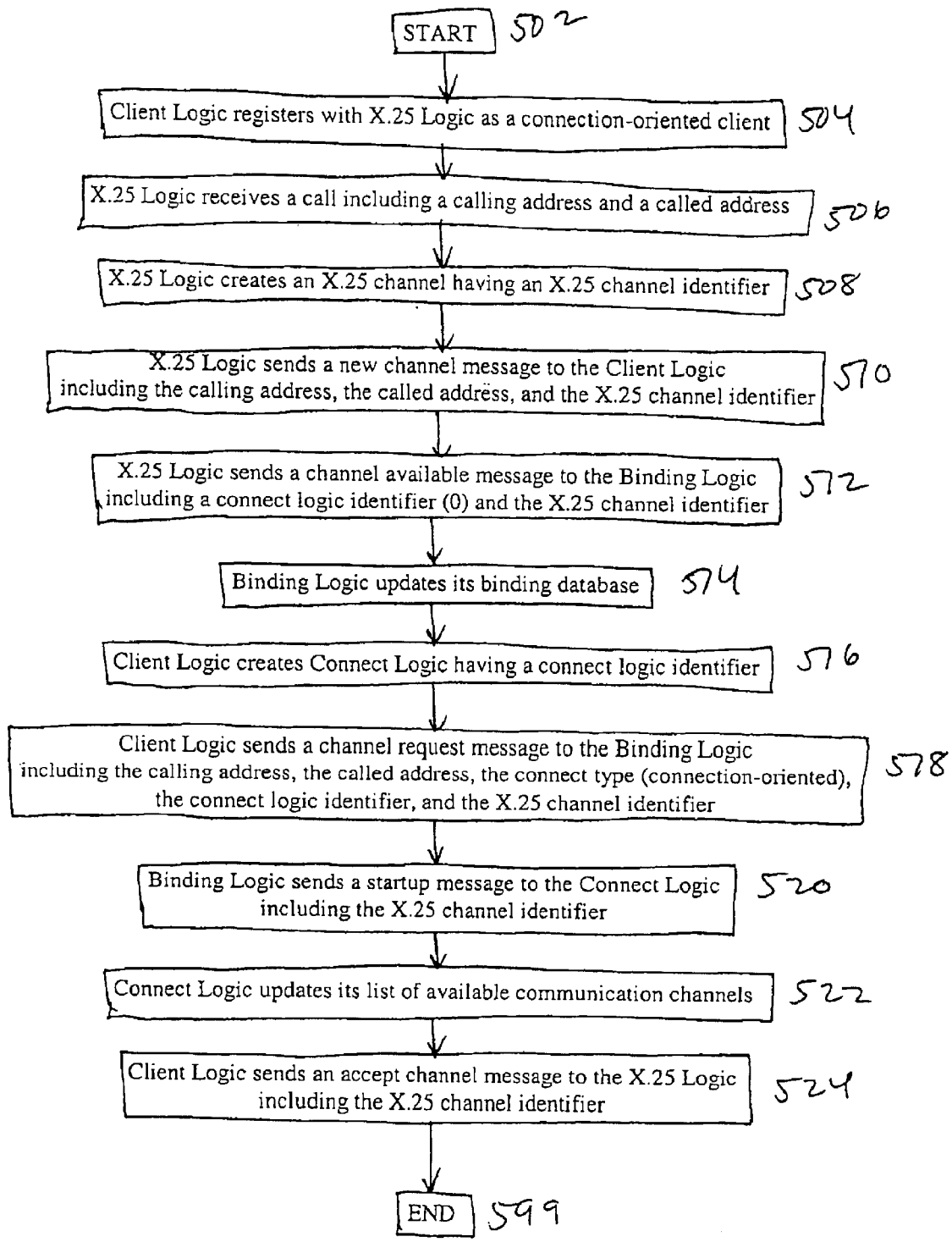

APPARATUS AND METHOD FOR BINDING A CONNECTION-ORIENTED CLIENT TO A COMMUNICATION CHANNEL

PRIORITY

The present patent application claims priority from the commonly-owned U.S. Provisional Patent Application No. 60/121,661 entitled CORRELATING DATA STREAMS OF DIFFERENT PROTOCOLS, which was filed on Feb. 25, 1999 in the names of Richard Crump, Janet Doong, Okoziem Allen, and Debra Guttormsen, and is hereby incorporated herein by reference in its entirety.

CROSS-REFERENCE TO RELATED APPLICATIONS

The present patent application may be related to the following commonly-owned U.S. patent applications, which are hereby incorporated herein by reference in their entireties:

U.S. patent application Ser. No. (2204/169) entitled CORRELATING DATA; STREAMS OF DIFFERENT PROTOCOLS, which was filed in the names of Richard Crump and Janet Doong on even date herewith;

U.S. patent application Ser. No. (2204/A13) entitled MANAGING ADDRESSES IN A COMMUNICATION SYSTEM, which was filed in the names of Richard Crump and Debra Guttormsen on even date herewith; and U.S. patent application Ser. No. (2204/A14) entitled ENCODING ADDRESSES IN A COMMUNICATION SYSTEM, which was filed in the names of Okoziem Allen and Richard Crump on even date herewith.

FIELD OF THE INVENTION

The present invention relates generally to communication systems, and more particularly to binding a connection-oriented client to a communication channel.

BACKGROUND OF THE INVENTION

In today's information age, communication networks are often used for interconnecting various network devices. Each network device supports various applications that communicate using various protocols. For convenience, an application in a network device is referred to hereinafter as a "client."

In order for a client to communicate over the communication network, the client requires a communication channel. The network device supports various communication channels. The client binds to a communication channel in order to communicate over the communication channel.

In a prior art embodiment of the invention, the network device includes binding logic that binds clients to communication channels. The binding logic is logically situated between the client logic and the X.25 logic within the network device. The binding logic binds all clients having the same destination to a shared set of communication channels. This type of binding does not work well for connection-oriented clients.

SUMMARY OF THE INVENTION

In accordance with one aspect of the invention, each connection-oriented client is bound to its own communication channel.

In one embodiment of the invention, each connection-oriented client is bound to its own X.25 logical channel. The X.25 logical channel includes a single virtual circuit.

BRIEF DESCRIPTION OF THE DRAWINGS

The foregoing and other objects and advantages of the invention will be appreciated more fully from the following further description thereof with reference to the accompanying drawings wherein:

FIG. 5 is a logic flow diagram showing exemplary logic for initiating a binding by the X.25 logic in an exemplary embodiment of the present invention.

DETAILED DESCRIPTION OF A PREFERRED EMBODIMENT

In an embodiment of the invention, the network device includes client logic supporting a number of clients, binding logic, and driver logic supporting various types of communication channels. The binding logic is logically situated between the client logic and the driver logic within the network device, and in particular between the client logic and the X.25 logic. The binding logic sets up bindings between clients and communication channels. The binding logic provides a common interface to the clients for all communication channels, and thus the clients do not require any logic that is specific to a particular type of communication channel.

In one embodiment of the invention, the communication channels are X.25 logical channels. X.25 is a common networking protocol that includes a frame-based link layer and a packet-based network layer. X.25 uses virtual circuits in order to multiplex multiple communication streams over a single link layer connection. An X.25 logical channel may include one or more virtual circuits. In such an embodiment, the driver logic includes X.25 logic for managing X.25 logical channels.

Figure 1:
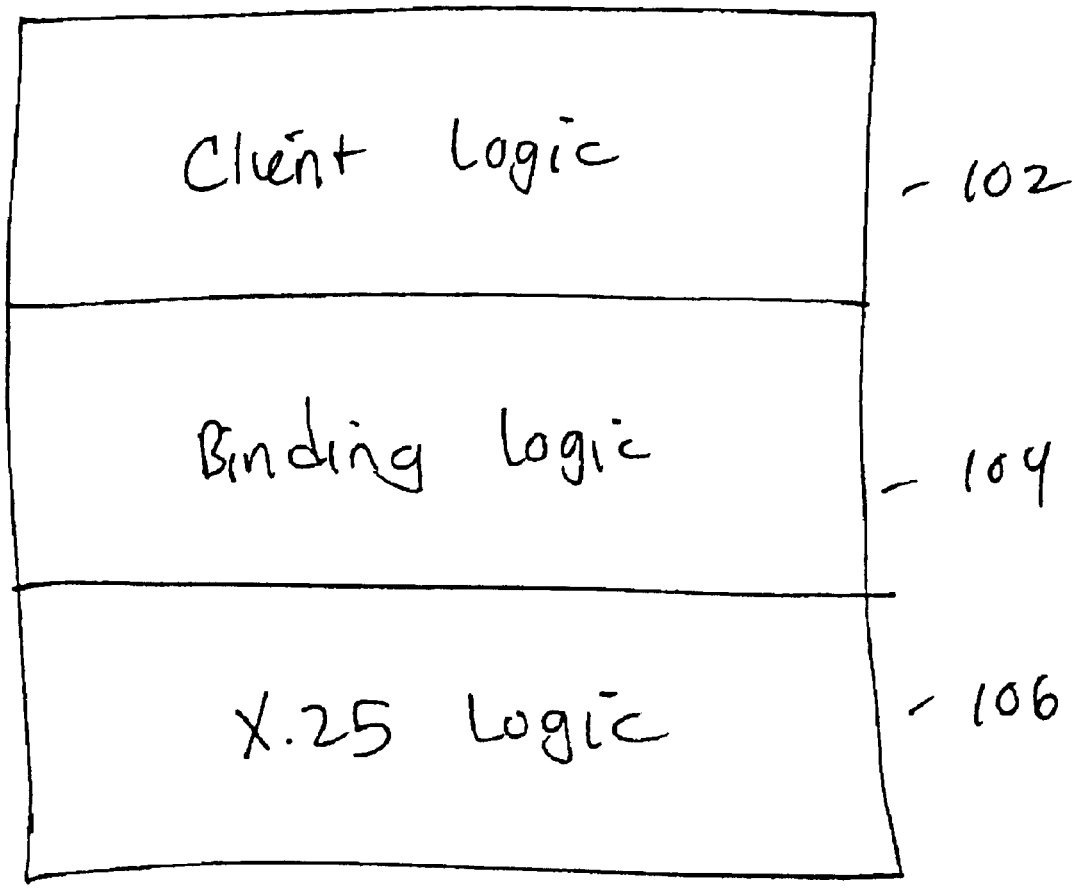
FIG. 1 is a block diagram showing the relationship between the client logic, the binding logic, and the X.25 logic in an exemplary embodiment of the present invention.

FIG. 1 is a block diagram 100 showing the relationship between the client logic 102, the binding logic 104, and the X.25 logic 106 in an exemplary embodiment of the present invention. The binding logic 104 is logically situated between the client logic 102 and the X.25 logic 106. The binding logic sets up bindings between clients and X.25 logical channels. Such bindings may be initiated by the client logic 102, for example, upon requesting an X.25 communication channel, or by the X.25 logic 106, for example, upon receiving call over the X.25 network.

When a connection-oriented client binds to an X.25 logical channel, the binding logic 104 binds the connection-oriented client to its own X.25 logical channel. The X.25 logical channel includes a single virtual circuit, and is referenced by an X.25 channel identifier. No other clients utilize the communication channel.

In order to simplify the design of the client logic 102, the client logic 102 creates connect logic for each communication channel to which it binds. The connect logic is a separate operating system process from the client logic 102 that is referenced by a connect logic identifier. The connect logic maintains a list of available communication channels, which, for a connection-oriented client, will contain at most one communication channel. Data is exchanged between the client logic 102 and the connect logic using a message passing scheme based upon the connect logic identifier.

The binding logic 104 actually sets up a binding between the connect logic created by the client logic 102 and an X.25 logical channel created by the X.25 logic 106. Data is exchanged between the connect logic and the X.25 logical channel using a message passing scheme based upon the connect logic identifier and the X.25 channel identifier.

Initiating a Binding by the Client Logic

The network device may permit a connection-oriented client 102 to initiate a connection. In this case, when the client 102 requests a communication channel, the communication channel is created, and the client 102 is bound to the communication channel.

When the connection-oriented client logic 102 requires an X.25 logical channel, the client logic 102 creates connect logic for the connection, and sends a channel request message to the binding logic 104. The channel request message includes a calling address, a called address, a connect type indicating that a connection-oriented connection is requested, the connect logic identifier identifying the connect logic, and an X.25 channel identifier equal to zero indicating that a new X.25 logical channel is requested.

Upon receiving the channel request message from the client logic 102, the binding logic 104 sends a channel request message the X.25 logic 106. The channel request message includes the calling address, the called address, the connect type, and the connect logic identifier.

Upon receiving the channel request message from the binding logic 104, the X.25 logic 106 creates an X.25 channel having an X.25 channel identifier, and sends a channel available message to the binding logic 104 indicating that the X.25 channel was created. The channel available message includes the X.25 channel identifier to identify the X.25 channel, and also includes the connect logic identifier so that the binding logic 104 can correlate the X.25 channel with the connect logic.

Upon receiving the channel available message from the X.25 logic 106, the binding logic 104 updates its binding database to bind the connect logic identified by the connect logic identifier and the X.25 channel identified by the X.25 channel identifier, and sends a startup message to the connect logic including the X.25 channel identifier. The start up message confirms that the binding was successfully created.

Upon receiving the startup message from the binding logic 104, the connect logic updates its list of available communication channels to include the newly created X.25 channel.

Thereafter, when the client logic 102 needs to send data over the communication channel, the client logic 102 forwards the data to the connect logic. As part of its normal processing, the connect logic searches its list of available communication channels for a usable channel. Since there is only one communication channel for the connection-oriented client (i.e., the X.25 channel that was created by the X.25 logic 106), the connect logic forwards the data to the X.25 channel.

Similarly, when data is received over the X.25 channel, the data is forwarded to the connect logic, which in turn forwards the data to the client logic 102.

Figure 2:
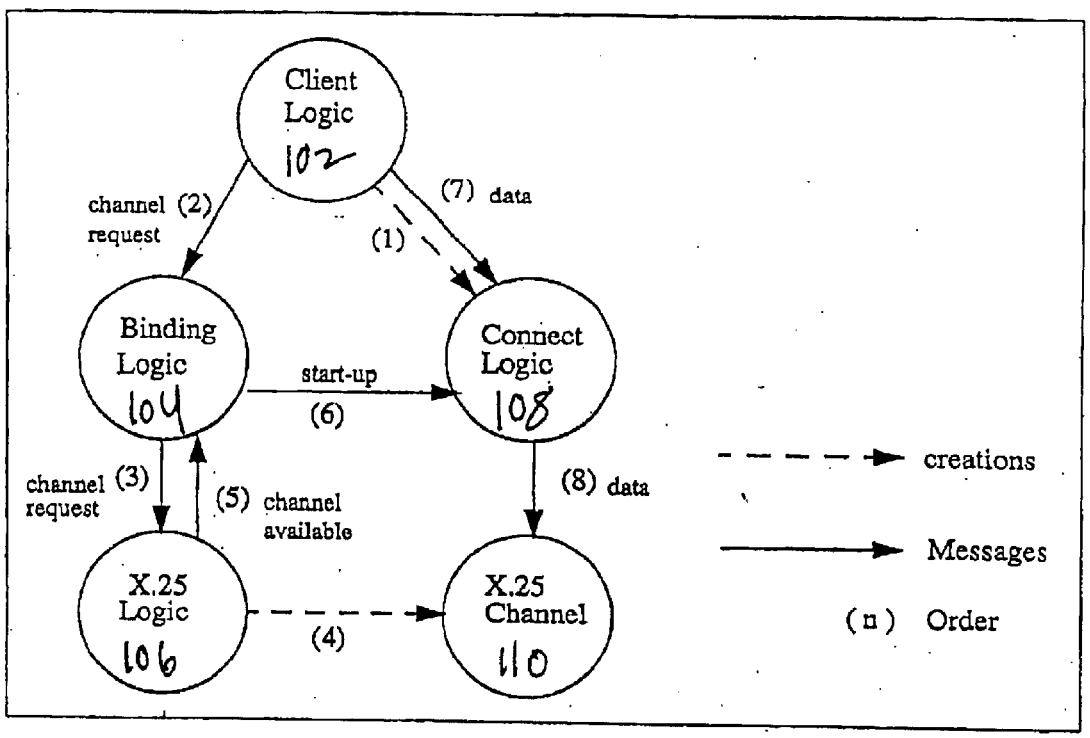
FIG. 2 is an event flow diagram showing the event flow for initiating a binding by the client logic in an exemplary embodiment of the present invention.

FIG. 2 shows the various event flows when a binding is initiated by the client logic 102. For convenience, an event flow in which an entity is created is shown by a dashed arrow. An event flow involving a message exchange is shown by a solid arrow. The event sequence number is shown in parentheses.

When the connection-oriented client logic 102 requires an X.25 logical channel, the client logic 102 creates connect logic 108 for the connection in step (1), and sends a channel request message to the binding logic 104 in step (2). The channel request message includes a calling address, a called address, a connect type indicating that a connection-oriented connection is requested, the connect logic identifier identifying the connect logic 108, and an X.25 channel identifier equal to zero indicating that a new X.25 logical channel is requested.

Upon receiving the channel request message from the client logic 102 in step (2), the binding logic 104 sends a channel request message to the X.25 logic 106 in step (3). The channel request message includes the calling address, the called address, the connect type, and the connect logic identifier.

Upon receiving the channel request message from the binding logic 104 in step (3), the X.25 logic 106 creates an X.25 channel 110 having an X.25 channel identifier in step (4), and sends a channel available message to the binding logic 104 indicating that the X.25 channel was created in step (5). The channel available message includes the X.25 channel identifier to identify the X.25 channel 110, and also includes the connect logic identifier so that the binding logic 104 can correlate the X.25 channel 110 with the connect logic 108.

Upon receiving the channel available message from the X.25 logic 106 in step (5), the binding logic 104 updates its binding database to bind the connect logic 108 identified by the connect logic identifier and the X.25 channel 110 identified by the X.25 channel identifier, and sends a startup message to the connect logic 108 including the X.25 channel identifier in step (6). The startup message confirms that the binding was successfully created.

Upon receiving the startup message from the binding logic 104 in step (6), the connect logic 108 updates its list of available communication channels to include the newly created X.25 channel 110.

Thereafter, when the client logic 102 needs to send data over the communication channel, the client logic 102 forwards the data to the connect logic 108 in step (7). As part of its normal processing, the connect logic 108 searches its list of available communication channels for a usable channel. Since there is only one communication channel for the connection-oriented client (i.e., the X.25 channel 110 that was created by the X.25 logic 106), the connect logic 108 forwards the data to the X.25 channel 110 in step (8).

Similarly, when data is received over the X.25 channel, the data is forwarded to the connect logic, which in turn forwards the data to the client logic 102. This event flow is not shown in FIG. 2.

Figure 3:
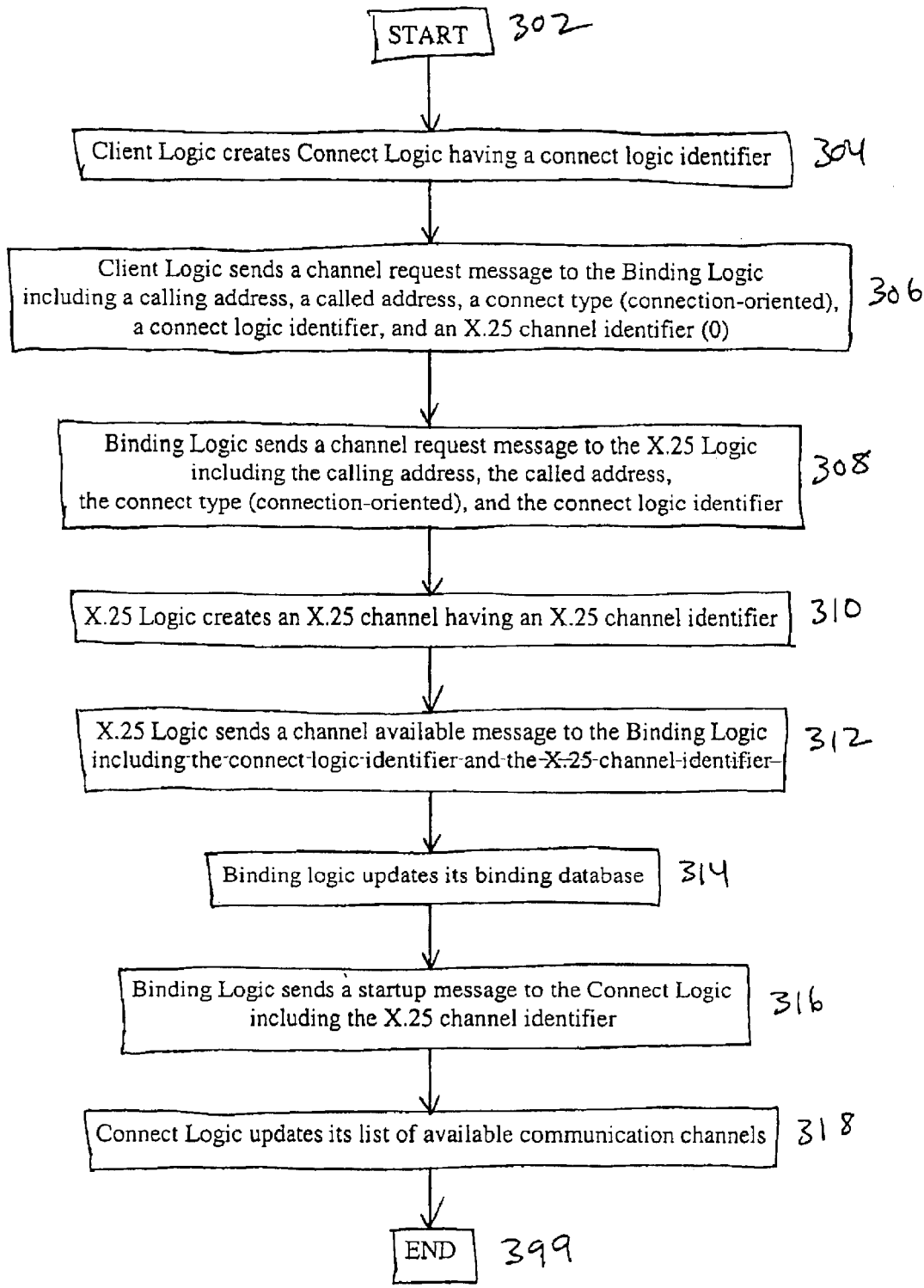
FIG. 3 is a logic flow diagram showing exemplary logic for initiating a binding by the client logic in an exemplary embodiment of the present invention.

FIG. 3 is a logic flow diagram showing exemplary logic 300 for initiating a binding by the client logic 102. Beginning at step 302, the client logic 102 creates connect logic having a connect logic identifier, in step 3041, and sends a channel request message to the binding logic 104, in step 306. The channel request message includes a calling address, a called address, a connect type indicating that a connection-oriented connection is requested, the connect logic identifier identifying the connect logic, and an X.25 hannel identifier equal to zero indicating that a new X.25 logical channel is requested.

Upon receiving the channel request message from the client logic 102, the binding logic 104 sends a channel request message to the X.25 logic 106, in step 308. The channel request message includes the calling address, the called address, the connect type, and the connect logic identifier.

Upon receiving the channel request message from the binding logic 104, the X.25 logic 106 creates an X.25 channel identifier having an X.25 channel identifier, in step 310, and sends a channel available message to the binding logic 104 indicating that the X.25 channel was created, in step 312. The channel available message includes the X.25 channel identifier to identify the X.25 channel, and also includes the connect logic identifier so that the binding logic 104 can correlate the X.25 channel with the connect logic.

Upon receiving the channel available message from the X.25 logic 106, the binding logic 104 updates its binding database to bind the connect logic identified by the connect logic identifier and the X.25 channel identified by the X.25 channel identifier, in step 314, and sends a startup message to the connect logic including the X.25 channel identifier, in step 316. The startup message confirms that the binding was successfully created.

Upon receiving the startup message from the binding logic 104, the connect logic updates its list of available communication channels to include the newly created X.25 channel, in step 318. The logic 300 terminates in step 399.

Initiating a Binding by the X.25 Logic

The network device may be configured to receive calls that are initiated by other network devices. In this case, a call is only accepted if there is a client 102 that is available to be bound to the connection. Thus, a connection-oriented client 102 may make itself available for an incoming call by registering with the X.25 logic 106. The client 102 may register to receive calls from a specific address or from any address.

When the X.25 logic 106 receives a call including a calling address and a called address, the X.25 logic 106 creates an X.25 channel having an X.25 channel identifier. The X.25 logic 106 then sends a new channel message to the client logic 102, and also sends a channel available message to the binding logic 104. The new channel message includes the calling address, the called address, and the X.25 channel identifier. The channel available message includes the X.25 channel identifier, and also includes a connect logic identifier equal to zero to indicate that there is no connect logic associated with the X.25 channel.

Upon receiving the channel available message from the X.25 logic 106, the binding logic 104 updates its binding database to include the newly created X.25 channel.

Upon receiving the new channel message from the X.25 logic 106, the client logic 102 creates connect logic for the connection, and sends a channel request message to the binding logic 104. The channel request message includes the calling address, the called address, a connect type indicating that a connection-oriented connection is requested, the connect logic identifier identifying the connect logic, and the X.25 channel identifier identifying the X.25 channel.

Upon receiving the channel request message from the client logic 102, the binding logic 104 binds the connect logic identified by the connect logic identifier and the X.25 channel identified by the X.25 channel identifier, and sends a startup message to the connect logic including the X.25 channel identifier. The startup message confirms that the binding was successfully created.

Upon receiving the startup message from the binding logic 104, the connect logic updates its list of available communication channels to include the newly created X.25 channel.

Thereafter, when data is received over the X.25 channel, the data is forwarded to the connect logic, which in turn forwards the data to the client logic 102.

Similarly, when the client logic 102 needs to send data over the communication channel, the client logic 102 forwards the data to the connect logic. As part of its normal processing, the connect logic searches its list of available communication channels for a usable channel. Since there is only one communication channel for the connection-oriented client (i.e., the X.25 channel that was created by the X.25 logic 106), the connect logic forwards the data to the X.25 channel.

Figure 4:
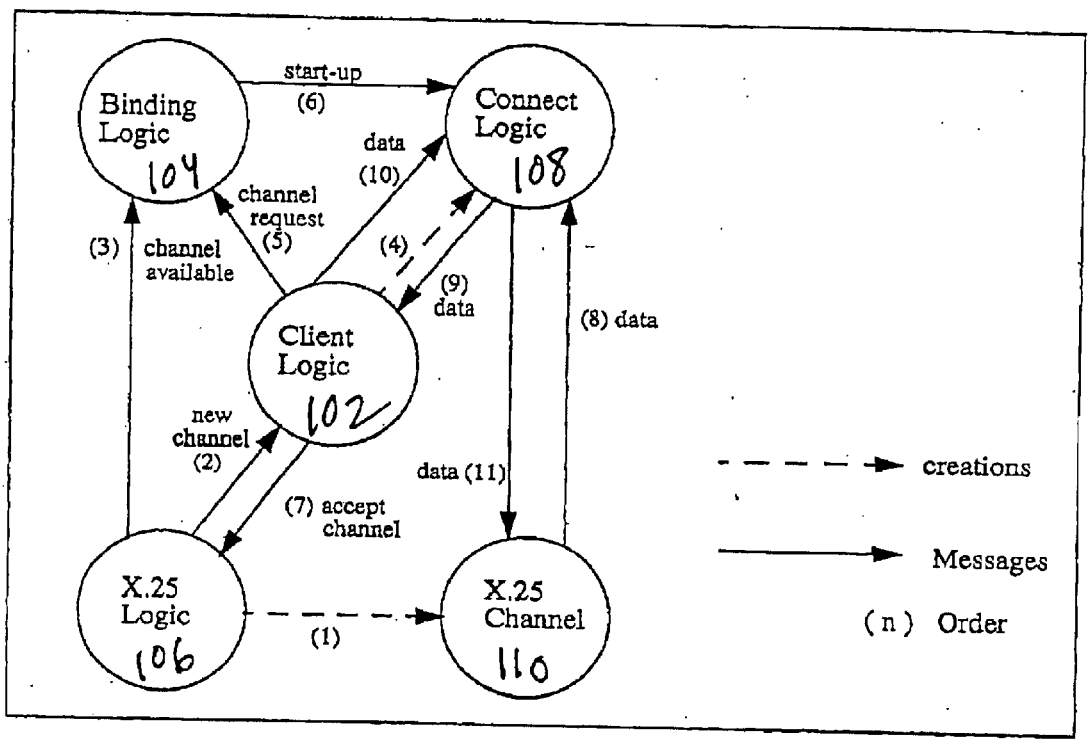
FIG. 4 is an event flow diagram showing the event flow for initiating a binding by the X.25 logic in an exemplary embodiment of the present invention.

FIG. 4 shows the various event flows when a binding is initiated by the X.25 logic 106. For convenience, an event flow in which an entity is created is shown by a dashed arrow. An event flow involving a message exchange is shown by a solid arrow. The event sequence number is shown in parentheses.

When the X.25 logic 106 receives a call including a calling address and a called address, the X.25 logic 106 creates an X.25 channel 110 having an X.25 channel identifier in step (1). The X.25 logic 106 then sends a new channel message to the client logic 102 in step (2), and also sends a channel available message to the binding logic 104 in step (3). The new channel message includes the calling address, the called address, and the X.25 channel identifier. The channel available message includes the X.25 channel identifier, and also includes a connect logic identifier equal to zero to indicate that there is no connect logic associated with the X.25 channel.

Upon receiving the channel available message from the X.25 logic 106 in step (3), the binding logic 104 updates its binding database to include the newly created X.25 channel 110.

Upon receiving the new channel message from the X.25 logic 106 in step (2), the client logic 102 creates connect logic 108 for the connection in step (4), and sends a channel request message to the binding logic 104 in step (5). The channel request message includes the calling address, the called address, a connect type indicating that a connection-oriented connection is requested the connect logic identifier identifying the connect logic 108, and the X.25 channel identifier identifying the X.25 channel 110.

Upon receiving the channel request message from the client logic 102 in step (5), the binding logic 104 binds the connect logic 108 identified by the connect logic identifier and the X.25 channel 110 identified by the X.25 channel identifier, and sends a startup message to the connect logic 108 including the X.25 channel identifier in step (6). The startup message confirms that the binding was successfully created.

Upon receiving the startup message from the binding logic 104, the connect logic 108 updates its list of available communication channels to include the newly created X.25 channel 110.

After the connect logic 108 is bound to the X.25 channel 110, the client logic 102 sends an accept channel message to the X.25 logic in step (7). The accept channel message includes the X.25 channel identifier.

Thereafter, when data is received over the X.25 channel 110, the data is forwarded to the connect logic 108 in step (8), which in turn forwards the data to the client logic 102 in step (9).

Similarly, when the client logic 102 needs to send data over the communication channel, the client logic 102 forwards the data to the connect logic 108 in step (10). As part of its normal processing, the connect logic 108 searches its list of available communication channels for a usable channel. Since there is only one communication channel for the connection-oriented client (i.e., the X.25 channel that was created by the X.25 logic 106), the connect logic 108 forwards the data to the X.25 channel 110 in step (11).

FIG. 5 is a logic flow diagram showing exemplary logic 500 for initiating a binding by the X.25 logic 106. Beginning at step 502, the client logic 102 registers with the X.25 logic 106 as a connection-oriented client available to be bound, in step 504. When the X.25 logic 106 receives a call including a calling address and a called address, in step 506, the X.25 logic 106 creates an X.25 channel having an X.25 channel identifier, in step 508. The X.25 logic 106 then sends a new channel message to the client logic 102, in step 510, and also sends a channel available message to the binding logic 104, in step 512. The new channel message includes the calling address, the called address, and the X.25 channel identifier. The channel available message includes the X.25 channel identifier, and also includes a connect logic identifier equal to zero to indicate that there is no connect logic associated with the X.25 channel.

Upon receiving the channel available message from the X.25 logic 106, the binding logic 104 updates its binding database to include the newly created X.25 channel, in step 514.

Upon receiving the new channel message from the X.25 logic 106, the client logic 102 creates connect logic for the connection, in step 516, and sends a channel request message to the binding logic 104, in step 518. The channel request message includes the calling address, the called address, a connect type indicating that a connection-oriented connection is requested, the connect logic identifier identifying the connect logic, and the X.25 channel identifier identifying the X.25 channel.

Upon receiving the channel request message from the client logic 102, the binding logic 104 binds the connect logic identified by the connect logic identifier and the X.25 channel identified by the X.25 channel identifier, and sends a startup message to the connect logic including the X.25 channel identifier, in step 520. The startup message confirms that the binding was successfully created.

Upon receiving the startup message from the binding logic 104, the connect logic updates its list of available communication channels to include the newly created X.25 channel, in step 522. The client logic 102 then sends an accept channel message to the X.25 logic 106 including the X.25 channel identifier, in step 524. The logic 500 terminates in step 599.

Error Recovery

During the normal course of operation, it is possible for either the client 102 or an X.25 channel to terminate. If a bound client terminates, then the binding logic 104 performs certain functions to "clean up" its associated X.25 logical channel. If a bound X.25 channel terminates, then the binding logic 104 notifies the client 102 that the communication channel is no longer available. In either case, the binding logic 104 unbinds the client 102 and its associated communication channel.

Alternative Embodiments

In the various embodiments describe heretofore, a connection-oriented client was bound to an X.25 communication channel. However, the present invention is in no way limited to binding connection-oriented clients to X.25 communication channels.

An exemplary embodiment of the present invention utilizes binding logic to bind a connection-oriented client to a communication channel. The binding logic provides a common interface to the clients for all communication channels, and is therefore a convenient implementational element of an exemplary embodiment of the invention. However, the present invention does not require binding logic, as similar logic may be included in either the client logic or the driver logic. Thus, the present invention is in no way limited to using binding logic.

Similarly, an exemplary embodiment of the present invention utilizes connect logic to simplify the design of the client, and is therefore a convenient implementational element of an exemplary embodiment of the invention. However, the present invention does not require separate connect logic, as similar logic may be included in the client. Thus, the present invention is in no way limited to using connect logic.

In an exemplary embodiment of the present invention, predominantly all of the logic described herein is implemented as a set of computer program instructions that are stored in a computer readable medium and executed by an embedded microprocessor system within a network device. Various embodiments of the invention may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A method for binding a connection-oriented client to a communication channel, the method comprising:

creating a communication channel for the connection-oriented client, the communication channel having a channel identifier;

creating a single virtual circuit for the connection-oriented client on the communication channel, wherein the virtual circuit is the only viral circuit on the communication channel;

binding the communication channel to the connection-oriented client based upon the channel identifier; and forwarding data received from the communication channel to the connection-oriented client based upon the channel identifier.

2. The method of claim 1, wherein the communication channel is an X.25 logical channel, and wherein the channel identifier is an X.25 channel identifier.

3. The method of claim 2, wherein binding the communication channel to the connection-oriented client based upon the channel identifier comprises including the channel identifier in binding messages.

4. The method of claim 1, further comprising forwarding data by the connection-oriented client over the communication channel based upon the channel identifier.

5. A network device comprising:

connection-oriented client logic stored on a computer readable medium;

binding logic stored on said computer readable medium; and driver logic, stored on said computer readable medium, wherein the driver logic is operable to create a communication channel for the connection-oriented client logic, the communication channel having a channel identifier, wherein the driver logic is operable to create a single virtual circuit for the connection-oriented client logic in the communication channel, wherein the virtual circuit is the only virtual circuit on the communication channel, wherein the binding logic is operable to bind the connection-oriented client logic to the communication channel using the channel identifier, and wherein the driver logic is further operable to forward data received from the communication channel to the connection-oriented client based upon the channel identifier.

6. The network device of claim 5, wherein the drive logic includes X.25 logic for creating an X.25 communication channel having an X.25 channel identifier, and wherein the binding logic binds the connection-oriented client and the X.25 communication channel using the X.25 channel identifier.

7. A program product comprising a computer readable medium having embodied therein a computer program for binding a connection-oriented client to a communication channel, connection-oriented client logic;

binding logic; and driver logic, wherein the driver logic is programmed to create a communication channel for the connection-oriented client logic, the communication channel having a channel identifier, wherein the driver logic is programmed to create a single virtual circuit for the connection-oriented client logic on the communication channel, wherein the virtual circuit is the only virtual circuit on the communication channel, wherein the binding logic is programmed to bind the connection-oriented client logic and the communication channel using the channel identifier, and wherein the driver logic is further programmed to forward data received from the communication channel to the connection-oriented client logic based upon the channel identifier.

8. The program product of claim 7, wherein the driver logic includes X.25 logic for creating an X.25 communication channel having an X.25 channel identifier, and wherein the binding logic binds the connection-oriented client and the X.25 communication channel using the X.25 channel identifier.

9. A method comprising:

requesting a channel by a connection-oriented client;

creating the channel by a driver, the channel having a channel identifier;

creating a single virtual circuit for the connection-oriented client on the communication channel, wherein the virtual circuit is the only virtual circuit on the communication channel;

binding the channel to the connection-oriented client based upon the channel identifier; and forwarding data received from the communication channel to the connection-oriented client based upon the channel identifier.

10. A method comprising:

registering to receive a call by a connection-oriented client;

receiving a call by a driver;

creating a channel by the driver, the channel having a channel identifier;

creating a single virtual circuit for the connection-oriented client on the communication channel, wherein the virtual circuit is the only virtual circuit on the communication channel;

binding the channel to the connection-oriented client based upon the channel identifier; and forwarding data received from the communication channel to the connection-oriented client based upon the channel identifier.

* * * * *